Patented July 3, 1951

2,559,333

UNITED STATES PATENT OFFICE 2,559,333

STABILIZED COMPOSITIONS CONTAINING HIGH MOLECULAR WEIGHT HALOGENATED MATERIALS

Francis Munroe Abell, Louisville, Ky., assignor, by mesne assignments, to Shell Development Company, Emeryville, Calif., a corporation of Delaware No Drawing. Application October 14, 1949, Serial No. 121,445

15 Claims. (Cl. 260—45.8)

This invention relates to a new composition of matter containing a high molecular weight halogenated organic material and a stabilizer therefor which inhibits or prevents the deteriorating effects of heat and light. More particularly, the invention is concerned with a composition containing a polymer of vinyl chloride in admixture with an especially effective stabilizer.

Halogen-containing organic materials of high molecular weight such as polymers and copolymers of vinyl chloride are usually fabricated into useful articles by use of heat in milling and/or molding operations. However, these fabricating operations employing heat tend to decompose the halogen-containing material so that it becomes discolored as well as stiffens and loses pliability. Moreover, exposure of the halogen-containing material to light, especially sunlight which is rich in ultraviolet radiation, also causes discoloration as well as softening and surface pitting of the halogen-containing material. Various substances have been added to retard or prevent such discoloration and deterioration, but the need for improvement in this respect still remains.

According to the present invention, discoloration and deterioration of halogen-containing organic materials of high molecular weight induced by the action of heat and/or light are suppressed or prevented by incorporation therewith of a small proportion of (1) a polyglycidyl ether of a polyhydric alcohol and (2) a polyhydric phenol. When used alone in admixture with the halogen-containing material, the polyhydric phenol has no stabilizing action, and in fact, is usually detrimental in this respect. It was therefore surprising and unexpected to discover that use of the polyhydric phenol in combination with the polyglycidyl ether gave a stabilizing action which was of synergistic character, i. e., was greater than the sum of the actions of the two substances alone.

The high molecular weight halogen-containing material, which is the principal constituent of the composition, may be any substance containing an appreciable proportion of halogen and a molecular weight of at least 2000. No particular upper limit to the molecular weight is necessary to realize the advantages of the invention so long as it is above about 2000. The stabilization is obtained with the halogen-containing organic materials having molecular weights of about 10,000, 25,000, 50,000, 100,000, 150,000 or higher. While it is preferred to employ the principle of the invention for the purpose of stabilizing chlorine-containing organic materials, substances containing other halogens such as bromine, fluorine or iodine are also suitable. In general, the halogen atom or atoms are linked directly to a carbon atom which in turn is linked to no other atoms than carbon, hydrogen or other halogen atoms which may be the same or different from the first. Among the materials stabilized, are polyvinyl chloride, afterchlorinated polyvinyl chloride, copolymers of vinyl chloride with various polymerizable compounds containing olefinic double bonds such as vinyl acetate, vinyl chloride, acrylonitrile, maleic anhydride, styrene, etc.; halogenated polyolefins such as chlorinated polyethylene, brominated polyisobutylene, etc.; polymers of chloroprene as well as copolymers thereof with other polymerizable unsaturated compounds such as those named above; halogenated products of fats, train oils, waxes, and the high-boiling hydrocarbons and the like. In general, the stabilizing influence is particularly suitable with substances containing at least 10% halogen, particularly those with up to 75% halogen. Excellent results have been obtained upon stabilizing polyvinyl chloride as well as copolymers of vinyl chloride with up to 15% vinyl acetate. Especially suitable are copolymers of vinyl chloride and vinyl acetate containing about 85% to 96% vinyl chloride.

The glycidyl ethers used to stabilize the composition are ethers of polyhydric alcohols containing a plurality of glycidyl groups, and preferably contain only the elements carbon, hydrogen and oxygen. They include glycidyl polyethers of polyhydric alcohols such as the diglycidyl ether of dihydric alcohols like ethylene glycol, propylene glycol, trimethylene glycol, butylene glycol, diethylene glycol, triethylene glycol, dipropylene glycol and the like as well as the di-, tri-, and polyglycidal ethers of glycerol, diglycerol, erythritol, pentaglycerol, pentaerythritol, mannitol, sorbitol, polyallyl alcohol, polyvinyl alcohol and the like. The polyglycidyl ethers of the polyhydric alcohols are prepared by reacting the polyhydric alcohol with epichlorhydrin in the presence of 0.1 to 2% of an acid-acting compound as catalyst such as boron trifluoride, hydrofluoric acid or stannic chloride whereby the chlorhydrin ether is formed as product. The reaction is effected at about 50 to 125° C. with the proportions of reaction preferably being such that there is about 1 mole of epichlorhydrin for each molecular equivalent of hydroxyl group in the polyhydric alcohol. Thus, in preparing the ether of diethylene glycol, which glycol contains two hydroxyl groups in each molecule thereof, about two moles of epichlorhydrin for each mole of diethylene glycol are used. The resulting chlorhydrin ether from the reaction of a polyhydric alcohol with epichlorhydrin is dehydrochlorinated by heating at about 50° C. to 125° C. with a small, say 10% stoichiometrical excess of a base. For this purpose sodium aluminate gives good results.

Preparation of several glycidyl ethers of polyhydric alcohols suitable for use as stabilizer in the composition of the invention are illustrated in the following examples.

EXAMPLE I

In a reaction vessel provided with a mechanical stirrer and external cooling means was placed a quantity of 276 parts of glycerol and 828 parts of epichlorhydrin, and to this reaction mixture was added one part of 45% boron trifluoride ether solution diluted with nine parts of ether. The reaction mixture was agitated continuously, the temperature rising to 50° C. during a period of one hour and 44 minutes, at which time external cooling with ice water was applied. The temperature of the reaction mixture was maintained between 49° C. and 77° C. for one hour and 21 minutes.

To 370 parts of the product formed with glycerol and epichlorhydrin was added 900 parts of dioxane and 300 parts of powdered sodium aluminate, ($Na_2Al_2O_4$), in a reaction vessel provided with a mechanical agitator and a reflux condenser. The reaction mixture thus formed was continuously agitated and gradually heated to 93° C. during a period of one hour and 51 minutes. The temperature was held at 93° C. for a period of eight hours and 49 minutes. The reaction mixture was then cooled to room temperature (20–25° C.) and this inorganic material, such as sodium chloride and aluminum oxide, was removed by filtration of the cooled mixture. Dioxane and low boiling products were removed by heating the filtrate to 205° C. at 20 mm. pressure, whereupon 261 parts of a pale yellow product was obtained as a residue. This polyglycidyl ether of glycerol had a viscosity of D–E (Gardner-Holdt scale) and, therefore, a softening point (Durran's mercury method) substantially below 20° C. The product had an equivalent weight to epoxide of 149.

EXAMPLE II

In a reaction vessel fitted with a thermometer, reflux condenser, gas inlet tube and electrically-driven stirrer, were placed 272 grams of powdered pentaerythritol, 124 grams (2 moles) of ethylene glycol and 6 cc. of a $BF_3$-ethyl ether solution (45% $BF_3$). The reaction mixture thus formed was heated to about 135° C., whereupon ethylene oxide was introduced therein through the gas inlet tube. The mixture was then heated at 130–138° C. for 1 hour and 18 minutes. Ethylene oxide addition was discontinued and 136 grams of pentaerythritol (total used, 402 grams; 3 moles) were added to the reaction mixture. Following addition of pentaerythritol, the mixture was heated at 125–130° C. for 50 minutes. Ethylene oxide was then introduced through the gas inlet tube, for 3 hours at 125–170° C. The total quantity of ethylene oxide so introduced was 202 grams (4.6 moles).

The resulting reaction mixture was transferred to a reaction vessel, fitted with thermometer, reflux condenser and electrically-driven stirrer and heated to 120° C. Six cc. of the $BF_3$-ethyl ether solution were added. Epichlorhydrin (1570 grams; 17 moles) was then added during a period of 2 hours and 25 minutes, during which period the temperature varied from 97° C. to 118° C.

A quantity, 231 grams, of the epichlorhydrin reaction product so obtained was placed in a reaction vessel equipped with a thermometer, reflux condenser and electrically-driven stirrer. Three hundred cc. of dioxane, 20 cc. of water and 170 grams of sodium aluminate ($Na_2Al_2O_4$) were added. The reaction mixture thus formed was continuously agitated and heated at about 96° C. for 3 hours. The reaction mixture was treated as described in Example I above, except that the vacuum distillation was continued to 200° C. at 3 mm. pressure. The product, 159 grams, was a clear, very pale yellow liquid, having a viscosity of H (Gardner-Holdt scale). The product also had an epoxide equivalent of 161 and an average molecular weight of 360 (determined by standard freezing point method with benzophenone); this corresponds to an average of about 2.2 epoxide groups per molecule.

The 1,2-epoxide value of the glycidyl ethers described herein is determined by heating a one gram sample of the ether with an excess of the pyridinium chloride dissolved in pyridine (made by adding pyridine to 16 cc. of concentrated hydrochloric acid to a total volume of 1 liter) at the boiling point for 20 minutes whereby the pyridinium chloride hydrochlorinates the epoxy groups to chlorhydrin groups. The excess pyridinium chloride is then back titrated with 0.1N sodium hydroxide to the phenolphthalein end point. The epoxide value is calculated by considering the HCl as equivalent to the epoxide group. This method is used for obtaining all the epoxide values discussed herein.

The polyhydric phenols employed in the composition contain two or more phenolic hydroxyl groups linked to separate nuclear aromatic carbon atoms. Among suitable compounds of this class are mononuclear phenols like resorcinol, catechol, phloroglucinol, orcinol, xylorcinol, apionol, etc., or polynuclear phenols like bis - (4-hydroxyphenyl)-2,2-propane (bisphenol), 4,4'-dihydroxy benzophenone, bis - ( 4- hydroxyphenyl) - 1,1-ethane, bis-(4-hydroxyphenyl) - 1,1 - isobutane, bis - (4-hydroxyphenyl) - 2,2-butane, bis-(4-hydroxy - 2-methylphenyl)-2,2-propane, bis-(4-hydroxy-2-tert butyl phenyl)-2,2-propane, bis-(2-hydroxynaphthyl)-methane, 1,3-dihydroxynapthalene, 1,2,5,6 - tetrahydroxynapthalene, etc. The polyhydric phenols well-suited for use in the invention are of the formula $R(OH)_n$ wherein $n$ is an integer of 2 to 4, each hydroxyl group being linked directly to a different nuclear carbon atom of R which is an aromatic hydrocarbon radical. In general, it is preferred to employ a dihydric phenol, and it has been found that bisphenol is particularly suitable for the purpose intended.

The proportion of stabilizing substances employed in admixture with the high molecular weight halogen-containing organic materials may be varied in order to meet the stabilizing requirements needed for the composition. In general, the amount of total stabilizer (polyglycidyl ether plus polyhydric phenol) is a substantial amount such as about 0.1% to 5% of the halogen-containing material. In some cases, however, it may be desirable to use smaller or larger proportions such as an added 20%, 30% or 50%. The use of larger proportions of the mixture of stabilizing substances produces greater stabilizing effect. Excellent results have been obtained with about 1% to 3% total stabilizer.

The relative proportions of the two stabilizing substances in the total stabilizer may also be varied although it is ordinarily preferred to use a substantial amount of each in the composition. In general, the two substances are employed in a weight ratio of 1:4 to 4:1 of the ether to the phenol and it is more desirable to use a more restricted range of about 3:7 to 7:3. Preferably, the polyglycidyl ether constitutes the major constituent. Very excellent results have been obtained with a mixture consisting of about 68% polyglycidyl ether of glycerol and 32% of bisphenol.

For the purpose of illustrating the stabilizing effect obtained with use in combination of a polyglycidyl ether of a polyhydric alcohol and a polyhydric phenol, the following examples are presented, but it is to be understood that the invention is not to be considered as limited to details thereof.

EXAMPLE III

Copolymers of vinyl chloride and vinyl acetate have properties which make them well suited for many uses. However, experience has shown that stabilization of the copolymers against deteriorating effect of light is an extremely difficult problem. Excellent light stabilization of such copolymers is obtained by employing the principle of the present invention.

A copolymer of vinyl chloride and vinyl acetate containing about 5% of vinyl acetate which is known in the trade as Vinylite VYNW was employed in the following tests. This copolymer had a measured molecular weight of about 24,000.

Compositions were prepared using 100 parts by weight of the copolymer, 50 parts of dioctyl phthalate, i. e., di(2-ethylhexyl) phthalate and 2 parts of the stabilizer indicated in Table I below, wherein "ether I" designates the polyglycidyl ether of glycerol prepared as described in Example I and "bisphenol" denotes bis-(4-hydroxyphenyl)-2,2-propane. The compositions were compounded by mixing the ingredients and then milling the mixture for 15 minutes on a roll mill with roll temperatures of 132 and 150° C. The sheet from the mill was then molded for two minutes at 160° C. All the compositions reported in Examples III and IV were prepared in this manner.

In order to test the stabilizing effect of the compositions to the deteriorating action of light, samples thereof were placed in a Fadeometer where they were subjected for the noted times to irradiation from an electric arc using carbon electrodes which is rich in ultraviolet radiation. The most marked manifestation of light deterioration is the development of surface pitting which was observed by visual inspection after the noted times of irradiation. The surface of all the compositions was smooth before irradiation.

In order to determine the extent of discoloration, the extinction coefficient of the compositions was measured with the aid of a Spectrophotometer, Model 11, manufactured by the Coleman Electric Company, Inc., Maywood, Illinois. This instrument has means for generating monochromatic light which is transmitted by means of a narrow slit through the sample whose discoloration is being measured. The light transmitted through the sample falls on a phototube and the current produced therein is measured with the aid of a potentiometer, which current is a measure of discoloration of the sample as compared to air which is colorless. By means of this instrument, numerical values of discoloration are obtained which are known as extinction coefficients. The extinction coefficient of air is zero and increased discoloration of a sample is indicated by increasingly larger extinction coefficients. The values represented in Table I were obtained using substantially monochromatic light of predominantly 5000 Å. wave length as were other extinction coefficients reported herein.

Table I

| Hours Radiation | 0 | 170 | | 340 | |
|---|---|---|---|---|---|
| Stabilizer | Extinction Coefficient | Extinction Coefficient | Surface Condition | Extinction Coefficient | Surface Condition |
| None | 0.9 | 1.2 | Badly pitted | 2.2 | Badly pitted. |
| Ether I | 0.8 | 0.6 | Smooth | 1.0 | Pitted. |
| Bisphenol | 1.0 | TD | Slightly pitted | TD | Do. |
| 68% Ether I and 32% bisphenol | 1.1 | 1.5 | Smooth | 1.3 | Smooth. |

TD = Too dark in color to measure extinction coefficient.

The superior stabilizing effect obtained by use of the polyglycidyl ether and the polyhydric phenol in combination is self-evident from the tabulated results.

The heat stability of the compositions containing the copolymer was tested by exposing samples to 160° C. in a constant temperature oven wherein air circulated, and in a closed mold at 170° C. out of contact with air. The heating in contact with air causes development of color which is suppressed by the stabilizer combination of the invention as is evident from the extinction coefficient results tabulated below.

Table II

| Stabilizer | Hours Treatment in Air Oven at 160° C. | | | |
|---|---|---|---|---|
| | 0 | 1.0 | 2.0 | 3.0 |
| None | 0.9 | 5.4 | 8.6 | 8.5 |
| Ether I | 0.8 | 1.6 | 2.9 | 4.4 |
| Bisphenol | 1.0 | 5.6 | 9.8 | TD |
| 68% Ether I and 32% bisphenol | 1.1 | 2.1 | 2.9 | 3.9 |

The exposure of the halogen-containing copolymer to heat while in contact with air causes the compositions to lose flexibility and become stiff. The sheets which had been heat-treated in the air oven at 160° C. therefore had the stiffness in flexure measured thereon according to A. S. T. M. designation D747-43T. The results in pounds per square inch are given in Table III which shows that the use of the combination gives much superior stabilization to use of any single substance alone.

Table III

| Stabilizer | Hours Treatment in Air Oven at 160° C. | | | |
|---|---|---|---|---|
| | 0 | 1.0 | 2.0 | 3.0 |
| None | 1,640 | 2,230 | 6,800 | 17,000 |
| Ether I | 1,230 | 2,200 | 18,900 | 18,700 |
| Bisphenol | 1,590 | 3,240 | 11,800 | 26,800 |
| 68% Ether I and 32% bisphenol | 1,330 | 1,650 | 3,600 | 7,300 |

The suppression of color development upon heating in the closed mold at 170° C. is evident from the extinction coefficient values given in Table IV below.

Table IV

| Stabilizer | Minutes Treatment in Closed Mold at 170° C. | | | |
|---|---|---|---|---|
| | 1 | 10 | 20 | 30 |
| None | 0.8 | 3.0 | 5.1 | 6.5 |
| Ether I | 0.7 | 2.2 | 3.9 | 4.8 |
| Bisphenol | 0.9 | 3.2 | 5.5 | 6.6 |
| 68% Ether I and 32% bisphenol | 0.9 | 1.5 | 2.2 | 2.7 |

EXAMPLE IV

Another group of compositions were prepared using polyvinyl chloride (Geon 101) having a molecular weight of about 100,000 as the halogen-containing material. The compositions again contained 100 parts by weight of polymer, 50 parts of dioctyl phthalate as plasticizer and 2 parts of stabilizer. The compositions were subjected to the heat treatment in the air oven at 160° C. and the extent of discoloration determined by measurement of the extinction coefficient. The results which again demonstrate the superior stabilization achieved are given in Table V. The adverse effect from use of bisphenol alone may be noted particularly in this table.

Table V

| Stabilizer | Hours Treatment in Air Oven at 160° C. | | | |
|---|---|---|---|---|
| | 0 | 1.0 | 2.0 | 3.0 |
| None | 0.6 | 4.5 | 7.6 | TD |
| Ether I | 0.5 | 1.8 | 6.5 | 7.5 |
| Bisphenol | 0.8 | 8.6 | TD | TD |
| 68% Ether I and 32% bisphenol | 0.6 | 1.4 | 2.0 | 3.6 |

High stability against heat-induced discoloration during molding was also achieved for the polyvinyl chloride compositions containing the mixture of substances as is evident from the extinction coefficient data given in Table VI.

Table VI

| Stabilizer | Minutes Treatment in Closed Mold at 170° C. | | | | |
|---|---|---|---|---|---|
| | 0 | 1 | 10 | 20 | 30 |
| None | 0.6 | 0.6 | 4.3 | 7.7 | TD |
| Ether I | 0.5 | 0.4 | 0.7 | 1.8 | 3.7 |
| Bisphenol | 0.8 | 0.8 | 4.9 | 8.2 | 9.4 |
| 68% Ether I and 32% bisphenol | 0.7 | 0.6 | 1.1 | 1.6 | 2.0 |

The stabilizer combination of the invention may be incorporated into the halogen-containing material by any of the methods known in the art for compounding resin compositions. Thus, the stabilizer combination may be milled into halogen-containing resins on a heated roll mill, be introduced along with solvents which are later evaporated from the stabilized composition, or be incorporated into an aqueous emulsion or latex of halogen-containing material which is later deposited and fused. In general, the stabilizer composition is incorporated as uniformly as possible with the substance to be stabilized. Since the polyglycidyl ether is ordinarily a quite viscous to solid material and the polyhydric phenol is usually a solid, it is often desirable to premix their ingredients with up to about an added 100% of solvent such as a ketone like methyl isobutyl ketone whereby a mobile liquid composition is obtained which is convenient for incorporation into the halogen-containing organic material.

Other substances are often incorporated with the compositions of the invention to assist their utility such as solvents like hydrocarbons and/or ketones; pigments like lampblack, titanium dioxide, or lead chromate; plasticizers like dibutyl phthalate, tricresyl phosphate or dioctyl phthalate; and other stabilizers like polyglycidyl ethers of polyhydric phenols, organic tin compounds or metal salts.

The following example illustrates application of the principle of the invention in a surface-coating composition.

EXAMPLE V

A white enamel of the following formula was prepared:

| Ingredient | Parts by weight |
|---|---|
| Titanium dioxide pigment | 17.00 |
| Vinylite VYHH (copolymer containing about 87% vinyl chloride and 13% vinyl acetate, mol. weight about 10,000) | 15.00 |
| Dioctyl phthalate | 2.30 |
| Stabilizer (68% Ether I and 32% bisphenol) | 3.50 |
| Polyglycidyl ether of bisphenol (condensate of 1.8 moles epichlorhydrin, 1 mol bisphenol and 2.16 moles NaOH) | 2.60 |
| Toluene | 23.80 |
| Methyl isobutyl ketone | 23.80 |
| Xylene | 6.00 |
| Methyl amyl ketone | 6.00 |
| | 100.00 |

The enamel was sprayed on metal panels coated with customary primer and baked for 15 minutes at 350° F. The baked enamel was very resistant to yellowing upon prolonged exposure to sunlight through glass.

I claim as my invention:

1. A composition of matter comprising a halogen-containing organic substance having a molecular weight above 2000 in admixture with a substantial amount each of a polyglycidyl ether of a polyhydric alcohol and a polyhydric phenol, the amount being sufficient to retard deterioration of the composition by action of heat and light.

2. A stabilized composition of matter comprising an organic substance having a molecular weight above 2000 and containing 10% to 75% of halogen in admixture with an added 0.1% to 50% of a polyglycidyl ether of a polyhydric alcohol and a dihydric phenol in a weight ratio of 1:4 to 4:1 of said ether to said phenol.

3. A stabilized composition of matter comprising a polymer of vinyl chloride with a molecular weight above 2000 and containing at least 10% chlorine in admixture with an added 1% to 5% of polyglycidyl ether of a polyhydric alcohol and a dihydric phenol, the weight ratio of said ether to said phenol being from 1:4 to 4:1.

4. A stabilized composition of matter comprising a polymer of vinyl chloride with a molecular weight above 2000 and containing at least 10% chlorine in admixture with an added 1% to 5% polyglycidyl ether of glycerol and bis-(4-hydroxyphenyl)-2,2-propane, the weight ratio of said ether to said phenol being from 3:7 to 7:3.

5. A stabilized composition of matter comprising polyvinyl chloride with a molecular weight above 2000 in admixture with an added 1% to 5% of polyglycidyl ether of polyhydric alcohol and a polyhydric phenol in a weight ratio of 1:4 to 4:1 of said ether to said phenol.

6. A stabilized composition of matter comprising polyvinyl chloride with a molecular weight above 2000 in admixture with an added 1% to 5% polyglycidyl ether of glycerol and a dihydric phenol, the weight ratio of said ether to said phenol being from 3:7 to 7:3.

7. A stabilized composition of matter containing polyvinyl chloride with a molecular weight of about 100,000 in admixture with about an added 2% of 68 parts by weight of polyglycidyl ether of glycerol and 32 parts by weight of bis-(4-hydroxyphenyl)-2,2-propane.

8. A stabilized composition of matter comprising a polymer of vinyl chloride with up to 15% vinyl acetate having a molecular weight above 2000 in admixture with an added 1% to 50% of polyglycidyl ether of a polyhydric alcohol and a polyhydric phenol in a weight ratio of 1:4 to 4:1 of said ether to said phenol.

9. A composition of matter comprising a polymer of vinyl chloride with up to 15% vinyl acetate having a molecular weight above 2000 in admixture with an added 1% to 5% polyglycidyl ether of glycerol and bis-(4-hydroxyphenyl)-2,2-propane, the weight ratio of said ether to said phenol being from 3:7 to 7:3.

10. A composition of matter comprising a copolymer of vinyl chloride and vinyl acetate containing about 85% to 96% vinyl chloride and having a molecular weight above 2000 in admixture with an added 1% to 50% of polyglycidyl ether of a polyhydric alcohol and a polyhydric phenol in a weight ratio of 1:4 to 4:1 of said ether to said phenol.

11. A composition of matter comprising a copolymer of vinyl chloride and vinyl acetate containing about 85% to 96% vinyl chloride and having a molecular weight above 2000 in admixture with an added 1% to 5% polyglycidyl ether of glycerol and a dihydric phenol the weight ratio of said ether to said phenol being from 3:7 to 7:3.

12. A composition of matter comprising a copolymer of vinyl chloride and vinyl acetate containing about 95% vinyl chloride and having a molecular weight of about 25,000 in admixture with an added 1% to 5% of polyglycidyl ether of a polyhydric alcohol and a polyhydric phenol in a weight ratio of 1:4 to 4:1 of said ether to said phenol.

13. A stabilized composition of matter comprising a copolymer of vinyl chloride and vinyl acetate containing about 95% vinyl chloride and having a molecular weight of about 25,000 in admixture with about an added 2% of 32 parts by weight of bis-(4-hydroxyphenyl)-2,2-propane and 68 parts by weight of polyglycidyl ether of glycerol.

14. A stabilized composition of matter comprising a copolymer of vinyl chloride and vinyl acetate containing about 87% vinyl chloride and having a molecular weight of about 10,000 in admixture with an added 1% to 50% of polyglycidyl ether of a polyhydric alcohol and a polyhydric phenol in a weight ratio of said ether to said phenol of 1:4 to 4:1.

15. A stabilized composition of matter comprising a copolymer of vinyl chloride and vinyl acetate containing about 87% vinyl chloride and having a molecular weight of about 10,000 in admixture with an added 1% to 50% polyglycidyl ether of glycerol and bis-(4-hydroxyphenyl)-2,2-propane, the weight ratio of said ether to said phenol being about 68:32.

FRANCIS MUNROE ABELL.

REFERENCES CITED

The following references are of record in the file of this patent:

UNITED STATES PATENTS

| Number | Name | Date |
| --- | --- | --- |
| 2,400,333 | Bent et al. | May 14, 1946 |
| 2,429,155 | Boyer | Oct. 14, 1947 |
| 2,456,216 | Richter | Dec. 14, 1948 |